United States Patent
Coleman et al.

(10) Patent No.: US 9,457,523 B2
(45) Date of Patent: Oct. 4, 2016

(54) CURVED RETARDER-BASED OPTICAL FILTERS

(71) Applicant: RealD Inc., Beverly Hills, CA (US)

(72) Inventors: David A. Coleman, Louisville, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 50 days.

(21) Appl. No.: 14/216,561

(22) Filed: Mar. 17, 2014

(65) Prior Publication Data

US 2014/0373997 A1 Dec. 25, 2014

Related U.S. Application Data (63) Continuation of application No. 12/249,876, filed on Oct. 10, 2008, now Pat. No. 8,687,275.

(60) Provisional application No. 60/979,326, filed on Oct. 11, 2007.

(51) Int. Cl.

| | |
|---|---|
| *B29D 11/00* | (2006.01) |
| *B32B 38/18* | (2006.01) |
| *G02B 5/30* | (2006.01) |
| *G02B 27/26* | (2006.01) |
| *B32B 37/12* | (2006.01) |

(52) U.S. Cl.
CPC ..... *B29D 11/00634* (2013.01); *B29D 11/0073* (2013.01); *B29D 11/00644* (2013.01); *B32B 38/1866* (2013.01); *G02B 5/3033* (2013.01); *G02B 27/26* (2013.01); *B29K 2995/0034* (2013.01); *B32B 37/12* (2013.01); *B32B 2307/40* (2013.01); *Y10T 156/10* (2015.01); *Y10T 156/1007* (2015.01); *Y10T 156/1744* (2015.01)

(58) Field of Classification Search
None
See application file for complete search history.

(56) References Cited

U.S. PATENT DOCUMENTS

| | | |
|---|---|---|
| 2,099,694 A | 11/1937 | Land |
| 2,431,942 A | 12/1947 | Land |

(Continued)

FOREIGN PATENT DOCUMENTS

| | | |
|---|---|---|
| EP | 0299509 | 1/1989 |
| EP | 0505998 | 9/1992 |

(Continued)

OTHER PUBLICATIONS

Patent Prosecution File History of U.S. Pat. No. 7,854,506 (Johnson et al.) Filed Oct. 22, 2009, issued on Dec. 21, 2010, entitled "Curved lenses configured to decode three-dimensional content on television and computer screens".

(Continued)

*Primary Examiner* — Barbara J Musser
(74) *Attorney, Agent, or Firm* — Neil G. J. Mothew; Penny L. Lowry (57) ABSTRACT

Curved polarization filters and methods of manufacturing such filters are described in the present disclosure. An exemplary method includes laminating a planar polarization layer to a planar retarder layer at a predetermined orientation and bending the laminate to create a curved filter. The strain on the retarder layer results in stress-induced birefringence, and the predetermined orientation of the retarder substantially compensates for the stress-induced birefringence. In some embodiments, the predetermination is based on mathematical models. In some other embodiment, the predetermination is based on experimental data.

9 Claims, 5 Drawing Sheets

(56) References Cited

U.S. PATENT DOCUMENTS

| | | | |
|---|---|---|---|
| 3,528,723 | A | 9/1970 | Rogers |
| 4,564,408 | A | 1/1986 | Crumbach et al. |
| 4,808,979 | A | 2/1989 | deHoff et al. |
| 5,051,309 | A * | 9/1991 | Kawaka et al. |
| 5,142,411 | A | 8/1992 | Fiala |
| 5,321,443 | A | 6/1994 | Huber et al. |
| 5,458,820 | A | 10/1995 | Lefebvre |
| 5,598,231 | A | 1/1997 | Lin |
| 5,702,813 | A | 12/1997 | Murata et al. |
| 5,751,481 | A | 5/1998 | Dalzell et al. |
| 5,805,336 | A | 9/1998 | Dalzell |
| 5,973,760 | A | 10/1999 | Dehmlow |
| 5,997,139 | A | 12/1999 | Yasuda |
| 6,162,376 | A | 12/2000 | Mead |
| 6,177,032 | B1 | 1/2001 | Smith et al. |
| 6,367,930 | B1 | 4/2002 | Santelices et al. |
| 6,638,583 | B1 | 10/2003 | Sharp et al. |
| 6,801,360 | B2 | 10/2004 | Phillips |
| 6,891,589 | B2 | 5/2005 | Hata et al. |
| 6,951,681 | B2 | 10/2005 | Hartley et al. |
| 7,036,932 | B2 | 5/2006 | Boulineau et al. |
| 7,077,985 | B2 | 7/2006 | Maki et al. |
| 7,106,509 | B2 | 9/2006 | Sharp |
| 7,393,100 | B2 | 7/2008 | Mertz |
| 7,517,081 | B2 | 4/2009 | Lipton |
| 7,524,053 | B2 | 4/2009 | Lipton |
| 7,784,938 | B2 | 8/2010 | Richards |
| 7,854,506 | B1 | 12/2010 | Johnson et al. |
| 7,946,703 | B2 | 5/2011 | Johnson et al. |
| 7,950,798 | B2 | 5/2011 | Johnson et al. |
| 2002/0154406 | A1 | 10/2002 | Merrill et al. |
| 2004/0114242 | A1 | 6/2004 | Sharp |
| 2006/0225827 | A1* | 10/2006 | Lei .................. B32B 27/08 156/64 |
| 2006/0285026 | A1 | 12/2006 | Robinson |
| 2006/0291054 | A1* | 12/2006 | Tomoguchi ........ B29D 11/0073 359/487.02 |
| 2007/0236809 | A1 | 10/2007 | Lippey |
| 2007/0263169 | A1 | 11/2007 | Lipton |
| 2008/0278807 | A1 | 11/2008 | Richards et al. |
| 2009/0097117 | A1 | 4/2009 | Coleman |
| 2011/0085237 | A1 | 4/2011 | Johnson et al. |

FOREIGN PATENT DOCUMENTS

| | | |
|---|---|---|
| EP | 1804094 | 7/2007 |
| JP | H09-005683 A | 1/1997 |
| JP | 2001-305341 A | 10/2001 |
| JP | 2002-512379 A | 4/2002 |
| JP | 2006-514325 A | 4/2006 |
| JP | 2006-323349 A | 11/2006 |
| KR | 2006-0020642 A | 3/2006 |
| KR | 10-0720732 | 5/2007 |
| WO | 1994-008266 A1 | 4/1994 |
| WO | 2007008777 | 1/2007 |

OTHER PUBLICATIONS

Patent Prosecution File History of U.S. Pat. No. 7,746,703 (Johnson et al.) Filed Jun. 30, 2009, issued on May 24, 2011, entitled "Curved lenses configured to decode three-dimensional content".

Patent Prosecution File History of U.S. Pat. No. 7,950,798 (Johnson et al.) Filed Jan. 7, 2009, issued on May 31, 2011, entitled "Curved lenses configured to decode three-dimensional content".

Patent Prosecution File History of U.S. Appl. No. 12/973,620 (Johnson et al.) filed Dec. 20, 2010, issued on May 24, 2011, entitled "Curved lenses configured to decode three-dimensional content on television and computer screens".

International search report and written opinion of international searching authority of PCT/US2010/040622, dated Feb. 10, 2010.

International search report and written opinion of international searching authority of PCT/US2008/079655, mailed Dec. 12, 2008.

International preliminary report on patentability in PCT/US2008/079655, mailed Apr. 22, 2010.

Summary of notice of reason for rejection and notice of reason for rejection dated Apr. 30, 2013, in Japanese Patent Application No. 2010-529126.

Ash, G., "Vital Contrast for the Display Industry", Optical Spectra, Sep. 1979, pp. 44-47.

Bandel, W., Optical Devices Incorporated, letter dated Oct. 15, 1993 with article attached entitled "Polarizers—Circular, Linear, High Temperature Variant", 3 pages.

Bennett et al., "Handbook of Optics, Section 10: Polarization", 10-1, 10-102, Para. 56, Walter G. Driscoll and William Vaughan eds., 1978.

E for M Corporation Company Publication, Liquid Crystal Display Polarizer Films, 1995, 3 pages.

Gustafson, J., "Plastic Polarizer—Vari-Lite", Jun. 1976, 3 pages.

Harvard University Publication, Completed Projects, Ophthalmic Applications of Circular Polarizers, Jan. 2011, 2 pages.

OCLI Information Display, Custom Display Filter Selections, May 1990, 3 pages.

Peli, E., "Ophthalmic Applications of Circular Polarizers", Journal of the American Optometric Association, pp. 298-302.

Polaroid Corporation Publication, Polaroid Schedule of Net Prices, Linear and Circular Polarizers, Dec. 1990, 4 pages.

Polaroid Corporation Publication, Polaroid Circular Polarizers for Contrast Improvement, Apr. 1978, 2 pages.

Polaroid Corporation Publication, Polaroid Circular Polarizers Contrast Enhancement Filters, Aug. 1979, 4 pages.

Shurcliff, W., "Polarized Light", Harvard University Press, Cambridge, MA, 1962.

Materials Data Sheet from web site "http://www.jsr.co.jp/jsr_e/pd/arton/htm/at02.html", of JSR Corporation, date downloaded Nov. 4, 2010, 1 page.

Office Action in co-pending KR application No. 10-2010-7009817, dated Aug. 18, 2014 (translation).

Patent Examination Report in AU application No. 2015200351, dated Feb. 29, 2016.

* cited by examiner

CURVED RETARDER-BASED OPTICAL FILTERS

CROSS-REFERENCE TO RELATED APPLICATIONS

This application is a continuation of and claims priority to U.S. patent application Ser. No. 12/249,876, filed Oct. 10, 2008, entitled "Curved Retarder-based Optical Filters", which is a non-provisional application of U.S. Provisional Patent Application No. 60/979,326, filed Oct. 11, 2007, entitled "Method and Apparatus for Curved Retarder-based Optical Polarization Filters", both of which are commonly assigned and incorporated herein by reference for all purposes.

TECHNICAL FIELD

This disclosure generally relates to optical filters, and more particularly, this disclosure relates to the manufacturing of curved optical filters for viewing stereoscopic or non-stereoscopic images.

BACKGROUND

Stereoscopic imaging involves recording three-dimensional (3-D) visual information or creating the illusion of depth in an image. One easy way to create depth perception in the brain is to provide the eyes of the viewer two different images, representing two perspectives of the same object, with a minor deviation similar to the perspectives that both eyes naturally receive in binocular vision. Many optical systems display stereoscopic images using this method. The illusion of depth can be created in a photograph, movie, video game, or other two-dimensional (2-D) image.

BRIEF SUMMARY

Stereoscopic and non-stereoscopic eyewear may include a low-cost optical filter manufactured by laminating a retarder film (e.g., a quarter wave plate ("QWP")) and a polarizer film from separate roll stock. Laminating a retarder film from roll stock to a polarizer film from roll stock involves cutting, aligning, and laminating the films at a suitable orientation that allows for the desired optical property. The end result of this process is a planar optical filter.

Disclosed in the present application is an optical filter in a curved configuration. The optical filter includes a polarization layer and a retarder layer laminated to the polarization layer at a predetermined angle, wherein the retarder and polarization layers are bent to the curved configuration. The retarder layer has a stress-induced birefringence, and the predetermined angle substantially compensates for the stress-induced birefringence and disposes the optical axis of the retarder film in a desired orientation. In one embodiment, the retarder layer is a QWP. In another embodiment, the retarder layer is a multi-layer retarder stack. In another embodiment, the polarizer layer is disposed on the inner layer of the retarder layer and an additional non-birefringent layer is laminated to the outer surface of the retarder layer. Other configurations are possible.

The present disclosure also provides a method for manufacturing a curved filter having a retardation axis in a desired orientation. The method includes providing a planar retarder film having an optical axis and a planar polarization film. The method also includes predetermining an angle at which the planar retarder film would be laminated to the planar polarization film, and laminating the planar retarder film and the planar polarization film at the predetermined angle. The method further includes bending the laminated retarder and polarization films, whereby a stress is exerted on the retarder film, the stress causing a stress-induced birefringence in the retarder film. The predetermined angle substantially compensates for the stress-induced birefringence and allow the optical axis of the retarder film to be in the desired orientation.

The present disclosure further provides an apparatus for laminating curved optical films, which includes a curved drum operable to provide a curved surface for bonding first and second optical films. The apparatus also includes at least two feeders operable to feed the first and second optical films onto the curve drum, a coating apparatus operable to apply adhesive to a surface of the first or second optical film, and a press roller operable to apply pressure against the first and second optical films and laminate the first and second optical films. Methods of manufacturing a filter using such an apparatus are also provided herein.

DETAILED DESCRIPTION

One technique to provide 3-D images is to encode light bound for each eye with different polarizations. Such a scheme may involve using orthogonal linearly polarized states, or circularly polarized states of opposite handedness. To present a stereoscopic picture using a circularly polarized 3-D image system, two images are projected and superimposed onto the same screen through circular polarizing filters of opposite handedness. The viewer wears eyeglasses that include a pair of circular polarizers ("CPs") of opposite handedness, which function as analyzers. Light that is of left-circular polarization is blocked by the right-handed analyzer while right-circularly polarized light is blocked by the left-handed analyzer. The result is similar to that of stereoscopic viewing with linearly polarized glasses, except the viewer can tilt his or her head and not compromise the quality of the polarization encoding and decoding.

Commonly-assigned U.S. Pat. No. 4,792,850 by Lenny Lipton, which is hereby incorporated by reference, discloses electronically driven CPs that alternate between left and right handedness in synchronization with the left and right images being displayed by the image projector. Direct view displays may also be used to encode the polarization states for different eyes; for example, alternate pixels of a direct view display may provide light of different polarization states. Another way to provide alternate right/left eye images is using a single display or projector that actively encodes the images using a polarization switch. Examples of such a technique are disclosed in the commonly-assigned U.S. patent application Ser. No. 11/424,087, entitled "Achromatic Polarization Switches," filed Jun. 14, 2006, which his hereby incorporated by reference.

Instead of encoding the 3-D information with polarization, the left and right eye images may be encoded on distinct wavelength bands as disclosed by Maximus et al. in U.S. patent application Ser. No. 10/576,707. Eyewear is then used to selectively filter the wavelengths appropriate for each eye. As described by Maximus et al., this filtering may be performed using dichroic filters; however, it is also possible to perform this filtering using polarization interference.

Additionally, the selective filtering of light by polarization interference may be used to enhance vision and/or protect eyes from harmful light rays. For example, such filtering may be used in sunglasses, color corrective eyewear, or protective eyewear. The selective filtering of incident light may provide any desired spectral transmission (including visible light and light not visible to the eye). The filtering structure may include multi-layer polarizing structures and may be formed by fabricating sheet laminates that are dye-cut to form inexpensive laminates. One embodiment of the apparatus operable to provide selective filtering includes a pair of polarizing elements that sandwich a retarder stack. Further details of the design of such eyewear are described by Sharp in commonly-assigned U.S. Pat. No. 7,106,509, which is hereby incorporated by reference.

In order to watch a motion picture using polarization encoding, the viewer wears a pair of paper frame or plastic frame glasses with polarization filters. The filters in such glasses are generally produced by laminating a retarder film to a polarizing film encapsulated by triactyl cellulose ("TAC") using adhesives. In some embodiments, the retarder film may be a QWP and the adhesive used for lamination is a pressure sensitive adhesive ("PSA"). In other embodiments, the retarder film may be a half-wave plate ("HWP"). Such viewing eyewear uses a planar filter.

A retarder, as described in the present application, may comprise N linear retarders that have been designed using Finite Impulse Response (FIR) filter techniques, wherein the impulse response of the N retarders generates at least N+1 output impulses from a polarized impulse input. As such, placing retarder stacks between neutral polarizers forms FIR filters, and these FIR filters can be designed using standard signal processing methods. The amplitude of each responsive output impulse is determined by the orientations of the retarders and the analyzing polarizer. Further details of the design approaches for the described retarder stacks are described in the commonly assigned U.S. Pat. No. 7,106,509 and by U.S. patent application Ser. No. 09/754,091, which is also incorporated by reference herein.

In general, the component stock films for retarders and polarizers have planar geometry. However, it is desirable both for optical improvement and for cosmetic enhancement to produce eyewear with curved filters. Shaping the filter to form a structure with either cylindrical or compound curvature subsequent to the lamination of component stock films can induce unacceptable strain in the component films. This strain either induces birefringence or modifies the desired intrinsic birefringence and thus degrades the performance of the filter.

In U.S. Pat. No. 5,051,309, Kawaki et al. disclose a method of forming polarizing glasses employing linear polarization elements. Kawaki's method involves either annealing the birefringent polycarbonate layers that are in front of the polarizing element to eliminate the birefringence or by "super-stretching" these layers to have a very large retardance parallel to the polarizer axis. The polarizer effectively hides the birefringence of the polymer. In U.S. Pat. No. 6,177,032, Smith et al. disclose a method of pre-forming the individual functional layers and then assembling the final filter. Again, birefringence of the layers preceding the polarizer is altered by annealing.

When a specific retardation and retarder angle are required, such as when CPs are used in combination with retarder stack filters, neither of these methods are acceptable. Thus, there remains a need for curved filters incorporating retarder-based polarization filters, in which the stress-induced birefringence is either compensated or minimized.

Exemplary embodiments of a curved optical filter and methods of manufacturing such a filter will be discussed below with references to FIGS. 1 to 6. Specifically, various methods and apparatus to compensate for or minimize strain-induced changes in the retarder layer of a filter will be disclosed.

Figure 1A:
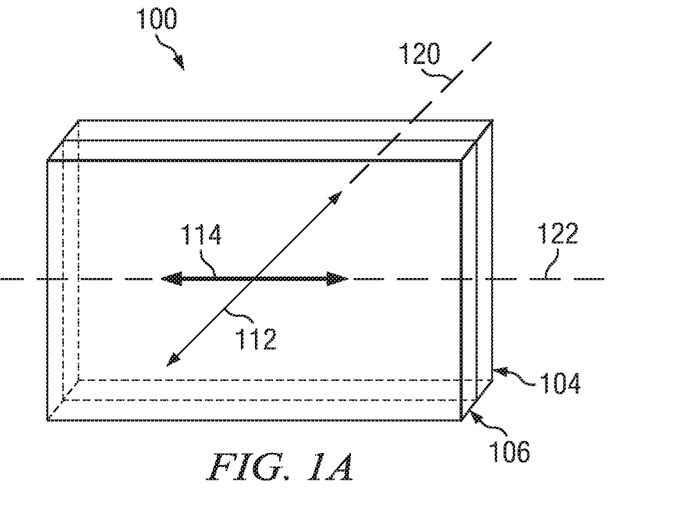
FIG. 1(A) is a perspective schematic view of a planar polarizer filter.

FIG. 1(A) shows a planar filter 100 having a retarder layer 104 laminated to a polarizer 106. The retarder layer 104 has an optical axis 112 along axis 120 and the polarizer layer 106 has an optical axis 114 along axis 122. In the illustrated embodiment, the retarder layer 104 is a QWP, but in other embodiments, the retarder layer 104 may be a half-wave plate ("HWP") or any retarders described in the present application. In some embodiments additional optical components may be added to the planar filter 100. For example, planar filter 100 may further include a substrate layer to provide better structural support. In some other embodiments, the ordering of the retarder and polarizer layers 104 and 106 may be inverted. It is to be appreciated that the structure of the filter 100 may be varied to satisfy various design needs.

Figure 1B:
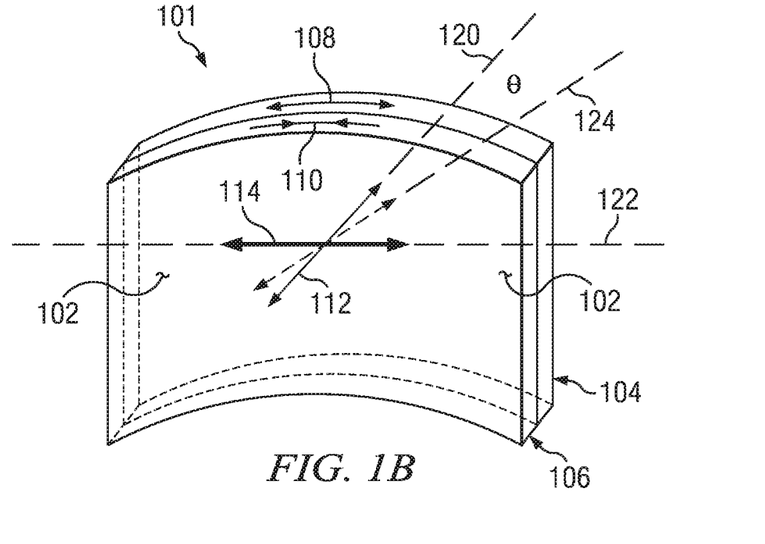
FIG. 1(B) is a perspective schematic view of a curved polarizer filter.

In the embodiment in FIG. 1(B), the filter 100 is bent around a first bend axis (not shown) to form a curved filter 101 by pulling on ends 102 of the filter 100. The cylindrical filter 101 can be mounted on a glasses frame to retain the desired curved configuration. It is to be appreciated that, in other embodiments, the filter 101 can be bent around multiple bent axes to have a compound curvature. In some embodiments, thermoforming processes known in the art may be used to retain the desired curved configuration. In one embodiment, the filter 101 is bent around first and second bend axes, and undergoes a thermoforming process to retain a compound curvature.

Because of the finite thickness of the filter 100, a compressive stress 110 is exerted on the polarizer layer 106 while a tensile stress 108 is exerted on the retarder layer 104. In both layers, the directions of stresses 108 and 110 are tangent to the curvature of the cylindrical filter, and the magnitude of each stress is uniform across the surface of the curved filter 101.

The optical effect of stretching or bending a material that displays strain birefringence can be conveniently described using the strain tensor, $\bar{\varepsilon}$. The eigenvectors ($\bar{\varepsilon}_1$, $\bar{\varepsilon}_2$, $\bar{\varepsilon}_3$) of $\bar{\varepsilon}$ are parallel to the principle axes of the dielectric tensor (often erroneously called optic axes). The birefringence, $\Delta n$, is proportional to the difference in the magnitudes of the eigenvalues of $\bar{\varepsilon}$, and the retardance is equal to the integral of $\Delta n$ across the thickness of the film; $\Delta n \cdot d$, in the case of uniform films of thickness d. For materials exhibiting linear elasticity, sequential stretching operations are equivalent to adding the strain tensor for each individual operation:

$$\vec{\varepsilon} = \vec{\varepsilon}' + \vec{\varepsilon}''. \tag{1}$$

The strain tensor of a stretched polymer retarder film with retardance $\Gamma$ and slow axis oriented parallel to the x-axis can be written:

$$\vec{\varepsilon}'' = \frac{1}{t \cdot K} \begin{bmatrix} \Gamma & 0 & 0 \\ 0 & 0 & 0 \\ 0 & 0 & 0 \end{bmatrix}, \tag{2}$$

where K is the strain optic coefficient and d is the film thickness. For convenience we neglect strain in the orthogonal directions, i.e., we choose a Poisson ratio of 0 although it can be shown that the derivation is general. It is trivially seen that additional stretching parallel to the x-axis increases the retardance while stretching perpendicular to the x-axis decreases the retardance. However, if the stretching is performed at a 45 degree angle to the x-axis, the additional strain tensor is:

$$\vec{\varepsilon}'' = \frac{1}{2}\begin{bmatrix} \varepsilon'' & -\varepsilon'' & 0 \\ -\varepsilon'' & \varepsilon'' & 0 \\ 0 & 0 & 0 \end{bmatrix}. \tag{3}$$

The eigenvalues of $\vec{\varepsilon}$ are then:

$$\varepsilon_1 = \frac{1}{2}\left(\frac{\Gamma}{d \cdot K} + \varepsilon'' - \sqrt{\left(\frac{\Gamma}{d \cdot K}\right)^2 + (\varepsilon'')^2}\right) \tag{4}$$

$$\varepsilon_2 = \frac{1}{2}\left(\frac{\Gamma}{d \cdot K} + \varepsilon'' + \sqrt{\left(\frac{\Gamma}{d \cdot K}\right)^2 + (\varepsilon'')^2}\right)$$

and the orientation of $\vec{\varepsilon}_1$ is $$\theta = \tan^{-1}\left(2\frac{\frac{\Gamma}{d \cdot K} - \sqrt{\left(\frac{\Gamma}{d \cdot K}\right)^2 + \left(\frac{\varepsilon''}{2}\right)^2}}{\varepsilon''}\right). \tag{5}$$

When equation 5 is expanded for $\varepsilon'' \gg \Gamma/(d \cdot K)$ it can be shown that for small additional stretching at 45 degrees from the optic axis, the change in the retarder orientation is linear in $\varepsilon''$. In contrast, equation 4 can be solved for $\Delta n$ to show that the change in retardation is quadratic in $\varepsilon''$ in the same limit.

Based on the above discussion, it is apparent that stretching parallel or perpendicular to the retarder optic axis only changes the magnitude of the retardance while the optic axis orientation is stable. In contrast, stretching at 45 degrees to the optic axis rotates the optic axis for relatively small strains.

Referring back to FIG. 1(B), the polarizer axis 122 is parallel to the strain direction, and accordingly, its orientation remains stable. The tensile stress 108, however causes an in-plane rotation of the retarder axis 112 by $\theta$ (equation 5) as well as an increase in the retardance according to equation 4. The retarder axis 112 is now oriented along axis 124. Due to the in-plane rotation of the retarder axis 112, the filter 101 now produces elliptical instead of circularly polarized light, and the discrimination between left and right eye images is compromised.

Figure 1C:
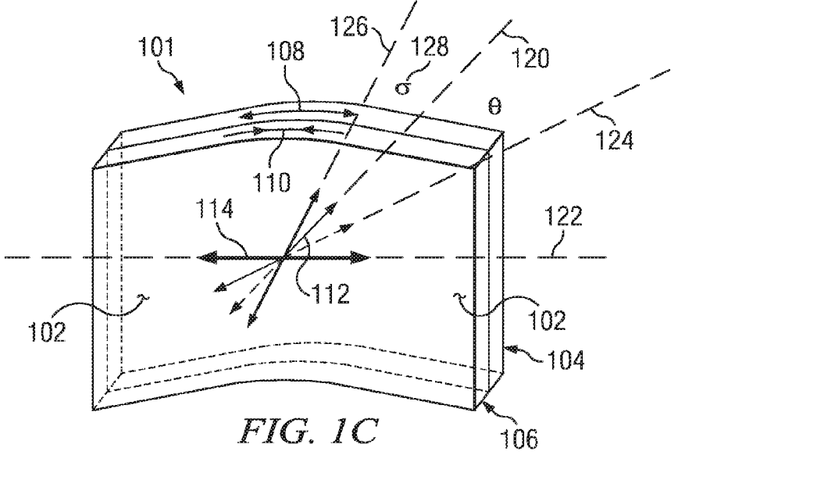
FIG. 1(C) is a perspective schematic view of a curved polarizer filter having an optical axis in a desired orientation.

Referring now to FIG. 1(C), when the stretching is uniform in both magnitude and direction across the surface of the film, it is possible to predict the change in both retardance and optic axis orientation and to compensate for it by adjusting the initial retardance and orientation of the film. Therefore, even materials such as polycarbonate with a large strain-optic coefficient may be used. In the embodiment illustrated in FIG. 1(c), the retarder and polarizer layers are laminated at a predetermined angle to compensate for the stress-induced birefringence in the retarder film and to dispose the retarder axis in the desired orientation as indicated by axis 120.

In order to produce retardance $\Gamma$ parallel to the x-axis in the presence of uniform strain of magnitude $\epsilon$ with principle strain direction oriented at $\theta$ degrees to the x-axis, it can be shown that an initial retardance of $$\Gamma_0 = \sqrt{\Gamma^2 + K^2 d^2 \epsilon^2 - 2K \cdot d \cdot \epsilon \cdot \Gamma \cos 2\theta}, \tag{6}$$

should be oriented at:

$$\theta_0 = -\tan^{-1}\left(\frac{\left(\frac{-\Gamma + K \cdot d \cdot \varepsilon \cdot \cos 2\theta +}{\sqrt{\Gamma^2 + K^2 d^2 \varepsilon^2 - 2K \cdot d \cdot \varepsilon \cdot \Gamma \cos 2\theta}}\right)\csc 2\theta}{K \cdot d \cdot \varepsilon}\right). \tag{7}$$

Equations (6) and (7) are applied individually for each layer in a multi-layer stack to account for differences in strain, retardance, and retardance orientation. The trivial solution occurs when the desired retardance is zero. Equations (6) and (7) reduce to the intuitive result that the initial retardance is chosen to exactly cancel the retardance induced by strain.

These conclusions can also be extended to polarizing components. The polymer matrix of a polarizer film may be highly stretched such that the assumptions about additive strain from the previous section are unlikely to apply. However, the symmetry remains the same: the polarization axis orientation will remain stable under parallel (and perpendicular) stretching, but may be rotated if the stretching occurs at 45 degrees to the polarizer axis. Consequently it is desirable to orient the polarizer axis parallel or perpendicular to the principle component of any expected strain.

It is possible to either analytically or numerically model the mechanical structure of the cylindrical filter 101 that would allow the tensile stress 108 in the outer retarder layer 104 to balance the compressive stress 110 on the inner polarization layer 106. By knowing the elastic constants for the layers of the filter 101, it is then possible to solve for the tensile stress 108 and then use equations (6) and (7) to compute and predetermine the initial retardance and retarder orientation that would compensate for the stress-induced birefringence. By laminating the retarder and polarizer layers at a predetermined off-set angle 128, the optic axis 112 of the retarder layer 104 would be rotated from axis 126 to the desired axis 120 as illustrated in FIG. 1(C) due to the bending of the curved filter 101 and the stress-induced birefringence.

In practice, it is often more convenient to simply measure the change in the retarder film at different radii of curvature and then generate a look-up table or chart for the off-set angle that would compensate for the stress birefringence. Due to the quadratic correction to the retardance for small strain, the same retardation film may be used for a broad range of curvatures while only adjusting the film orientation during lamination.

Figure 2:
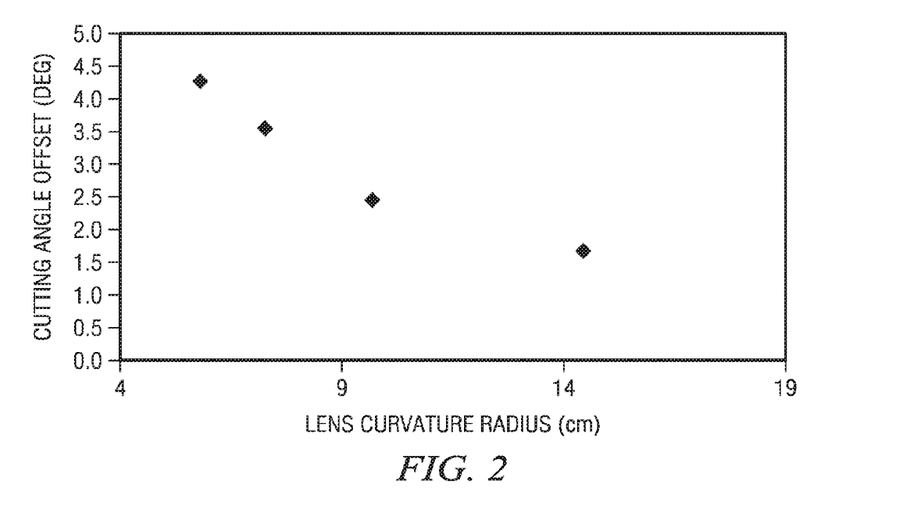
FIG. 2 is a chart correlating cylindrical curve radius with retarder angle adjustment for a curved filter.

An exemplary lookup chart for a CP filter is shown in FIG. 2. Plotted along the x-axis are the various radii of the CP filter and plotted along the y-axis are the corresponding off-set angles that would compensate for the stress-induced birefringence. The data were obtained by measuring the ellipticity of light exiting CP filters with varying radii of curvature. The analytic expression for the optic axis orientation was then used to determine the optic axis orientation in the bent filter and thus the offset angle for compensating it. For large radius curves, the offset angle goes to zero. For very small radius curves, the relation eventually brakes down as changes in retardance become increasingly important. It is to be appreciated that similar lookup charts can be created for other types for filters in accordance to the principles disclosed herein.

Figure 3:
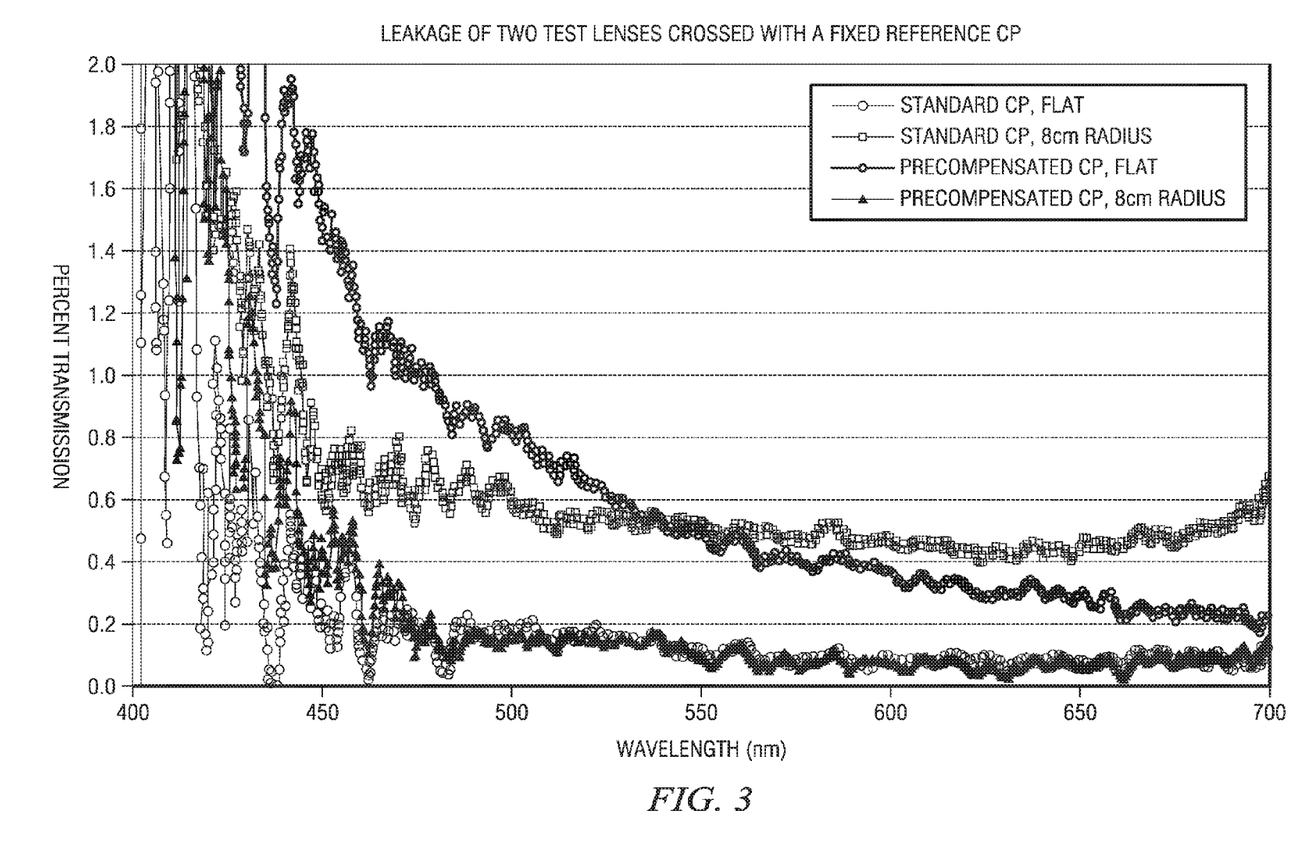
FIG. 3 is a chart illustrating the optical performance of various filters.

FIG. 3 is a chart illustrating the optical performance of various filters. The improved performance of a filter that has been adjusted to compensate for stress-induced birefringence relative to that of a filter that has not been pre-adjusted is demonstrated in FIG. 3. FIG. 3 shows a set of spectra obtained for two different filters that were crossed with a reference filter. The first filter is manufactured with a 45 degree optic axis orientation (without pre-adjustment) for the retarder; the second filter was pre-adjusted for an 8 cm radius of curvature using the cutting angle offset in FIG. 2. In the planar configuration, the first filter produced leakage below 0.2% over much of the visible spectrum whereas the second filter had much higher leakage as expected. When bent to a radius of curvature of 8 cm, the first filter produced leakage greater than 0.4% over the entire spectrum—highlighting the need for correction. The second filter performed nearly as well with a radius of 8 cm as the first filter did in the planar configuration.

In addition to adjusting the initial retardance and retarder orientation, stress-induced birefringence can also be reduced by using retarder films with optimal material properties. Irrespective of the stretching direction, the effect of induced strain decreases as the magnitude of the initial retardance increases. Therefore, it is advantageous to use as large of an initial retardance as possible relative to the quantity $K \cdot d \cdot \epsilon''$ in order to minimize the effect of induced strain on the final structure. Accordingly, it is desirable to minimize the thickness, d, of the film and or the strain optic coefficient, K. Specifically, it is preferred that the ratio $$\frac{K \cdot d \cdot \epsilon''}{\Gamma}$$

is less than 0.01 in order to maintain approximately a 1% uniformity in the retardance and optic axis orientation.

Satisfying the above prescription for any significant strain is difficult with polycarbonate-based retardation films because of the relatively high strain-optic coefficient of polycarbonate. When using such films, it is therefore preferable to choose thinner film stock. In the case in which the polycarbonate retarder film is approximately 60 µm thick, decreasing the thickness to 12 µm only increases the strain-optic stability by a factor of 5. Such thin films may be difficult to work with in the manufacturing setting and may be susceptible to damage during any solvent welding or other lamination processes. Improved strain resistance can be obtained by using optical plastics such as cellulose di-acetate or cyclic olefin copolymer ("COC") retarder film. The strain-optic coefficient of these materials is approximately 10 times smaller than that of polycarbonate, and thus, a thicker substrate may be used to ease manufacturability while still minimizing stress-induced birefringence. An exemplary embodiment is the COC-based film manufactured under the brand name Arton®. This material has excellent optical clarity, uniform birefringence, and a sufficiently small strain optic coefficient to enable thermoforming in a variety of applications.

Figure 4:
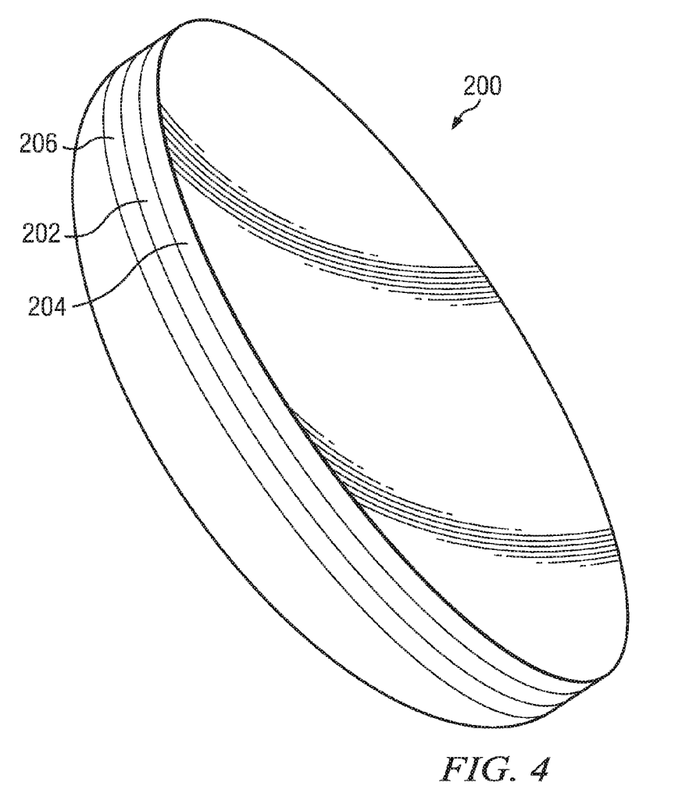
FIG. 4 is a perspective schematic view of a curved polarizer filter having a compound curvature.

FIG. 4 is a schematic view of a curved filter 200 that was bent around a plurality of bend axes and configured to have a compound curvature. The filter 200 includes a retarder layer 202 laminated to a polarizer layer 204. The filter 200 further includes a substrate layer 206. The compound curvature may be retained using a thermoforming process. In one embodiment, the thermoforming process includes applying heat to the substrate layer. To minimize the effect of stress birefringence resulted from the bending of the filter 200, the retarder layer 202 is preferably made of materials having strain optic coefficient ranging from 0.001 to 0.025. The thickness of the retarder layer is preferably between 50 to 120 microns. In an exemplary embodiment, the retarder layer 202 is made of cyclic olefin block copolymer. It is to be appreciated that the retarder layer can be made of other materials and have various thicknesses so long that the ratio $$\frac{K \cdot d \cdot \epsilon''}{\Gamma}$$

is approximately less than 0.01.

Figure 5:
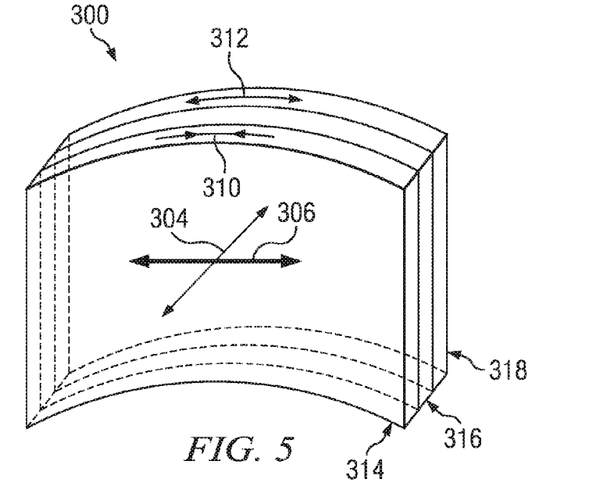
FIG. 5 is a perspective schematic view of another embodiment of a curved polarizer filter.

FIG. 5 is a perspective schematic view of another embodiment of a curved polarizer filter 300. Curved filter 300 includes a polarizer layer 314 having optic axis 306, a retarder layer 316 having an optic axis 304, and a non-birefringent mechanical layer 318. The mechanical layer 318 is added to sandwich the retarder layer 316 to balance the stain on the retarder layer 316. In some embodiments, the mechanical layer 318 may include a negative c-plate. The thickness and elastic modulus of the mechanical layer 318 is preferably chosen so that it exerts a tensile stress 312 that balances compressive stress 310, which would minimize the stress-induced birefringence in the retarder layer 316. Furthermore, the strain optic coefficient of the mechanical layer 318 preferably is sufficiently small that the tensile stress 312 imparts minimal additional in-plane birefringence. In an exemplary embodiment, the polarizer layer 314 may include a TAC encapsulated polarizer, and it would be sufficiently balanced mechanically by an equal thickness of TAC in the mechanical layer 318. As result, the orientation of the optic axis 304 of the retarder layer 316 would not be affected by stress-induced birefringence.

Figure 6:
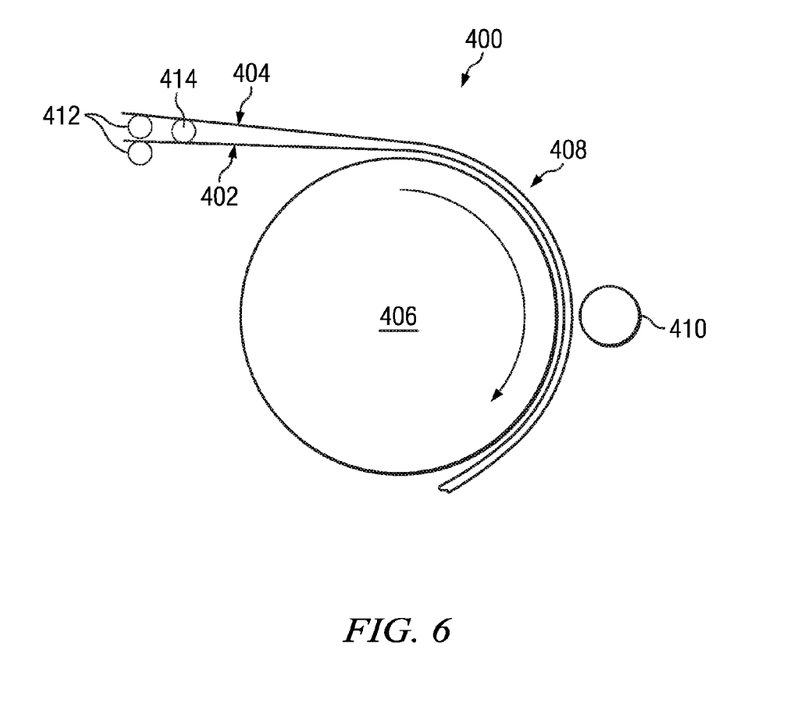
FIG. 6 is a schematic diagram of an embodiment of a lamination apparatus.

FIG. 6 is a schematic diagram of an embodiment of a lamination apparatus 400 for manufacturing a curved filter while minimizing the strain on the components of the curved filter. The lamination apparatus 400 includes a curved drum 406 operable to provide a curved surface for bonding first and second optical films 402 and 404. It is preferable that the radius of the drum 406 matches the radius of the finished eyewear. In an exemplary embodiment, the first optical film 402 is a polarizer film, and the second optical film 404 is a retarder film, such as a QWP film. In another exemplary embodiment, the second film 404 is a QWP oriented at 45 degrees to the first film 402. The lamination apparatus 400 further includes at least two feeders 412 operable to feed the first and second optical films onto the curved drum 406 and a coating apparatus 414 operable to apply adhesive to a surface of the first or second optical film. A press roller 410 of the lamination apparatus 400 is operable to apply pressure against the first and second optical films 402 and 404 to laminate them.

In operations, to laminate the first and second films 402 and 404, each film is fed onto the drum at different rates to accommodate the different radius of curvature of each film. The films 402 and 404 travel on the drum surface for a finite time through region 408 in order to allow the internal stress to be relieved. Press roller 410 completes the lamination process by exerting pressure on the films 402 and 404 and causing the adhesive to form bonds between the films 402 and 404.

Figure 7:
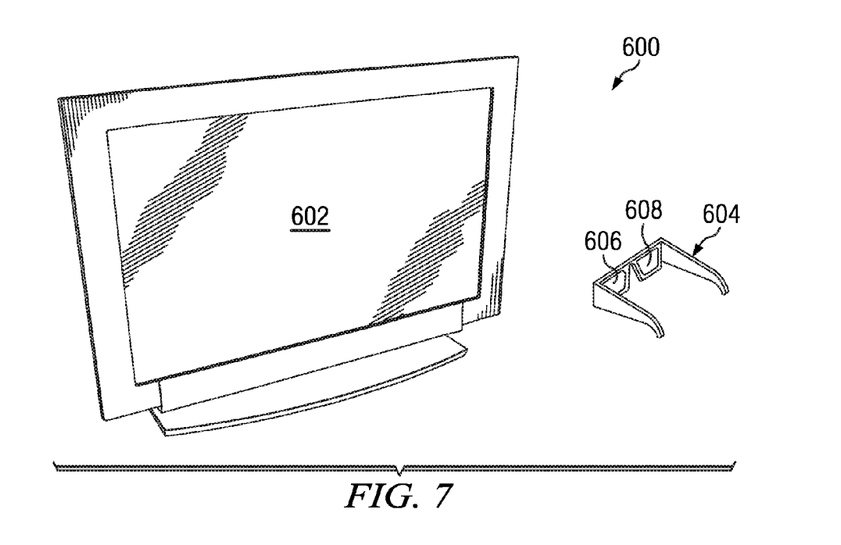
FIG. 7 is a display system incorporating curved filters in eyewear for viewing stereoscopic images.

It is to be appreciated that the curved filters disclosed in the present application can be incorporated into various eyewear for viewing stereoscopic or non-stereoscopic images displayed by any imaging systems described herein. For example, a display system 600 as illustrated in FIG. 7 can include a projection screen 602 and polarization filtering eyewear 604 that incorporates two curved filters 606 and 608. Stereoscopic 3-D imagery is observed using a single polarization-preserving screen 602 sequentially displaying left and right perspective imagery, with polarization filtering eyewears 604. In some embodiments, the curved filters 606 and 608 are of alternately orthogonal polarization. In some particular embodiments, the curved filters 606 and 608 are operable to provide circularly polarized light of opposite handedness. In an exemplary embodiment, the polarization-preserving screen 602 is a direct-view screen.

It will be appreciated by those of ordinary skill in the art that the invention(s) can be embodied in other specific forms without departing from the spirit or essential character thereof. Any disclosed embodiment may be combined with one or several of the other embodiments shown and/or described. This is also possible for one or more features of the embodiments. The steps herein described and claimed do not need to be executed in the given order. The steps can be carried out, at least to a certain extent, in any other order.

Further, it will be appreciated by one of ordinary skill in the art that various retardance and optic axis values depend sensitively on the mechanical properties of all of the layers and adhesives in the filter. It will also be appreciated that the circular polarizer disclosed herein may be combined with various other display components to perform similar results. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention (s), and their equivalents, that are protected thereby. In all instances, the scope of the claims shall be considered on their own merits in light of the specification, but should not be constrained by the headings set forth herein.

What is claimed is:

1. A method for manufacturing a curved optical filter, the method comprising:
   providing a drum having a curved surface;
   feeding a first optical film onto the drum at a first rate;
   feeding a second optical film onto an outer surface of the first optical film at a second rate;
   coating the outer surface of the first optical film or an inner surface of the second optical film with an adhesive;
   rotating the drum as the first and second optical films are being fed; and
   laminating the first and second optical films together using a press roller, whereby the laminated first and second optical films have a curvature.

2. The method of claim 1, wherein the first optical film is fed onto the curved surface of the drum.

3. The method of claim 1, wherein the first and second optical films are fed into the drum at different angles with respect to a tangent of the curved surface of the drum.

4. The method of claim 1, wherein the drum and an inner surface of the curved filter have the same curvature.

5. The method of claim 1, wherein the first optical film is a polarizer.

6. The method of claim 1, wherein the first optical film is a retarder.

7. The method of claim 5, wherein the second optical film is a retarder.

8. The method of claim 1, wherein the adhesive is a pressure-sensitive adhesive.

9. The method of claim 1, wherein the second rate is faster than the first rate.

* * * * *